(12) United States Patent
Dufosse et al.

(10) Patent No.: US 7,139,394 B2
(45) Date of Patent: Nov. 21, 2006

(54) LEAK-TOLERANT HANDSFREE TELEPHONE

(75) Inventors: Stéphane Dufosse, Cormeilles en Parisis (FR); Nicolas Janaszek, Anhiers (FR)

(73) Assignee: TCL Communication Technology Holdings Limited (CN)

( * ) Notice: Subject to any disclaimer, the term of this patent is extended or adjusted under 35 U.S.C. 154(b) by 369 days.

(21) Appl. No.: 10/100,008

(22) Filed: Mar. 19, 2002

(65) Prior Publication Data

US 2002/0136398 A1 Sep. 26, 2002

(30) Foreign Application Priority Data

Mar. 20, 2001 (FR) .................................. 01 03764

(51) Int. Cl.
*H04M 1/00* (2006.01)
*H04M 9/00* (2006.01)
*H04B 1/38* (2006.01)

(52) U.S. Cl. ........................... 379/428.01; 379/420.02; 455/90.3

(58) Field of Classification Search ........... 379/433.02, 379/428.01, 420.02; 455/575.1, 90.3; 381/96; 235/472.02
See application file for complete search history.

(56) References Cited

U.S. PATENT DOCUMENTS

| | | | |
|---|---|---|---|
| 4,086,445 A | | 4/1978 | Robinson |
| 5,109,422 A | * | 4/1992 | Furukawa ..................... 381/96 |
| 5,365,050 A | * | 11/1994 | Worthington et al. .. 235/472.02 |
| 5,369,701 A | * | 11/1994 | McAteer et al. ....... 379/420.02 |
| 5,790,679 A | | 8/1998 | Hawker et al. |
| 6,321,070 B1 | * | 11/2001 | Clark et al. .............. 455/575.1 |

FOREIGN PATENT DOCUMENTS

| | | |
|---|---|---|
| EP | 0 909 077 A2 | 4/1999 |
| WO | WOX 00/45615 A2 | 8/2000 |

* cited by examiner

*Primary Examiner*—William J. Deane, Jr.
(74) *Attorney, Agent, or Firm*—Morgan, Lewis, and Bockius LLP

(57) ABSTRACT

To amplify low frequencies emitted in handsfree mode by a multifunction earpiece (earpiece, loudspeaker, buzzer) of a telephone handset, the earpiece being tolerant to leaks in a discreet mode of operation, a tube projects into a cavity in the casing of the handset, around an aperture through which the cavity communicates with the exterior of the casing. The handset thus includes a multifunction earpiece that is tolerant of leaks in a discreet mode of operation and provides good sound quality in handsfree mode.

52 Claims, 2 Drawing Sheets

LEAK-TOLERANT HANDSFREE TELEPHONE

CROSS-REFERENCE TO RELATED APPLICATIONS

This application is based on French Patent Application No. 01 03 764 filed Mar. 20, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a telephone handset and more particularly to a leak-tolerant multifunction telephone handset earpiece for handsfree use.

2. Description of the Prior Art

Prior art mobile telephones such as the Alcatel One Touch Pocket (registered trademarks) have a casing in which there is a cavity filled with air. Transducers constituting an earpiece and a microphone are placed in the cavity, on a wall of the casing. The earpiece transducer has a diaphragm for converting an electrical signal into soundwaves. Apertures are provided in the housing, in line with the transducer diaphragm, through which the soundwaves are emitted. There is a volume of air to the rear of the diaphragm to enable it to move and emit a soundwave of sufficient amplitude.

A small gap between the earpiece and the ear of the user causes sound leakage. The acoustic impedance seen by the transducer is then significantly modified.

The mobile telephone previously described operates only in a discreet mode, i.e. with the ear of the user close to the earpiece. It is highly sensitive to variations in acoustic impedance due to a slight gap between the ear and the transducer. It is not leak-tolerant. If the user's ear is not pressed fully against the earpiece, or moves slightly away from it, the frequency response curve at the ear is greatly modified. For example, low frequencies perceived by the ear of the user are strongly attenuated in the discreet mode. This strongly degrades the perceived sound quality. Also, this mobile telephone has no handsfree or speakerphone mode.

The document EP-A-364 935 describes a telephone in which the diaphragm of the earpiece transducer is connected acoustically to the ear of the user by apertures in the telephone. The front of the diaphragm is acoustically coupled to the interior volume of the telephone.

The documents DE-2 815 051 and U.S. Pat. No. 4,160,135 describe earpieces having a connection between the front of the diaphragm and the volume to the rear of the diaphragm.

The document WO-A-98/24214 describes a leak-tolerant mobile telephone having an interior volume and a transducer. Apertures leading to the exterior are formed on the front side of the transducer, whose diaphragm faces the apertures. Other apertures connect the interior volume to the exterior.

The document WO-A-00/21330 describes a mobile telephone having a large volume of air inside the casing to the rear of the transducer. This mobile telephone is leak-tolerant in that the frequency response curve is relatively insensitive to a slight gap between the transducer and the ear. However, the dimensions of the volume of air make the casing too bulky for a mobile telephone.

The document WO-A-00/21330 also describes a leak-tolerant mobile telephone having a small volume of air to the rear of the transducer and coupled to the atmosphere to form a resonant acoustic circuit. However, this mobile telephone has a cut-off frequency band in the audible spectrum. The perceived acoustic quality is then degraded.

The document WO-A-00/21330 further describes a leak-tolerant mobile telephone having a pair of connections between the rear of the diaphragm and the exterior and a pair of connections between the front of the diaphragm and the exterior. In each pair of connections, one connection opens into a contact area for the ear of the user and another connection opens to the atmosphere at a distance from the contact area. This telephone combines a small interior volume and an acoustic short circuit due to leaks. It therefore features a cut-off at low frequencies.

The above telephone handsets are leak-tolerant in discreet mode, but have drawbacks. None of them provides a handsfree or speakerphone mode, i.e. a mode in which the user is away from the handset.

Also, the Alcatel One Touch 300 mobile telephone (registered trademarks) offers a speakerphone mode but is not leak-tolerant in discreet mode.

Thus none of the above telephones combines good leak tolerance in discreet mode with a handsfree or speakerphone mode.

There is therefore a need for a telephone handset having a handsfree mode and a leak-tolerant discreet mode.

SUMMARY OF THE INVENTION

The invention therefore provides a telephone handset including a casing, a cavity formed in the casing, a first aperture in a wall of the casing whereby the cavity communicates with the exterior of the casing, a transducer having a membrane blocking the first aperture, a second aperture in a wall of the casing whereby the cavity communicates with the exterior of the casing, and a tube projecting into the cavity and one end of which is fixed to the wall of the casing and surrounds the second aperture.

In one embodiment the transducer is adapted to emit selectively sound at a power greater than 250 mW.

In another embodiment the tube has a length greater than 3 mm.

In a further embodiment the tube has an axis normal to the wall to which it is fixed.

In a further embodiment the first and second apertures are less than 25 mm apart in a common wall of the casing.

In a further embodiment the handset includes a plurality of first apertures blocked in a sealed manner by the membrane.

The membrane can block the first aperture in a sealed manner.

In a further embodiment the printed circuit is accommodated in the cavity.

Other features and advantages of the invention will become apparent on reading the following description of embodiments of the invention, which is given by way of example and with reference to the accompanying drawings.

DETAILED DESCRIPTION OF THE PREFERRED EMBODIMENT

The present invention proposes to amplify low frequencies emitted in handsfree mode by a telephone handset earpiece that is leak-tolerant in discreet mode. It thus proposes to provide a tube projecting into a cavity in the casing of the handset, around an aperture through which the cavity communicates with the exterior of the casing.

Figure 1:
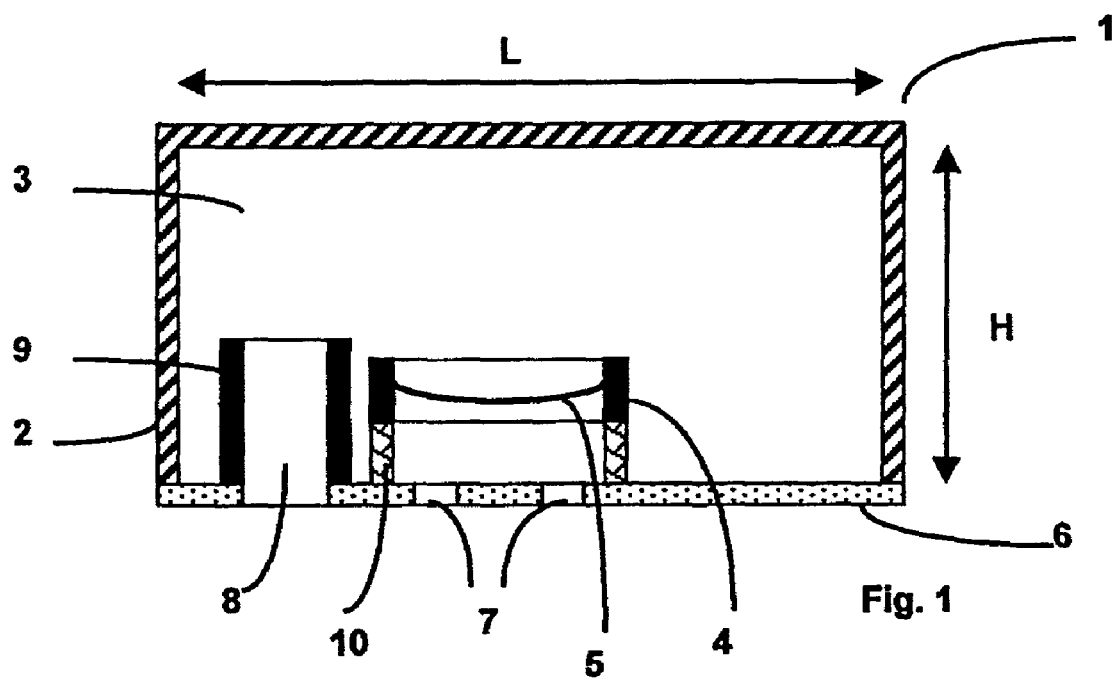
FIG. 1 is a sectional view of a telephone handset according to the invention.
Figure 2:
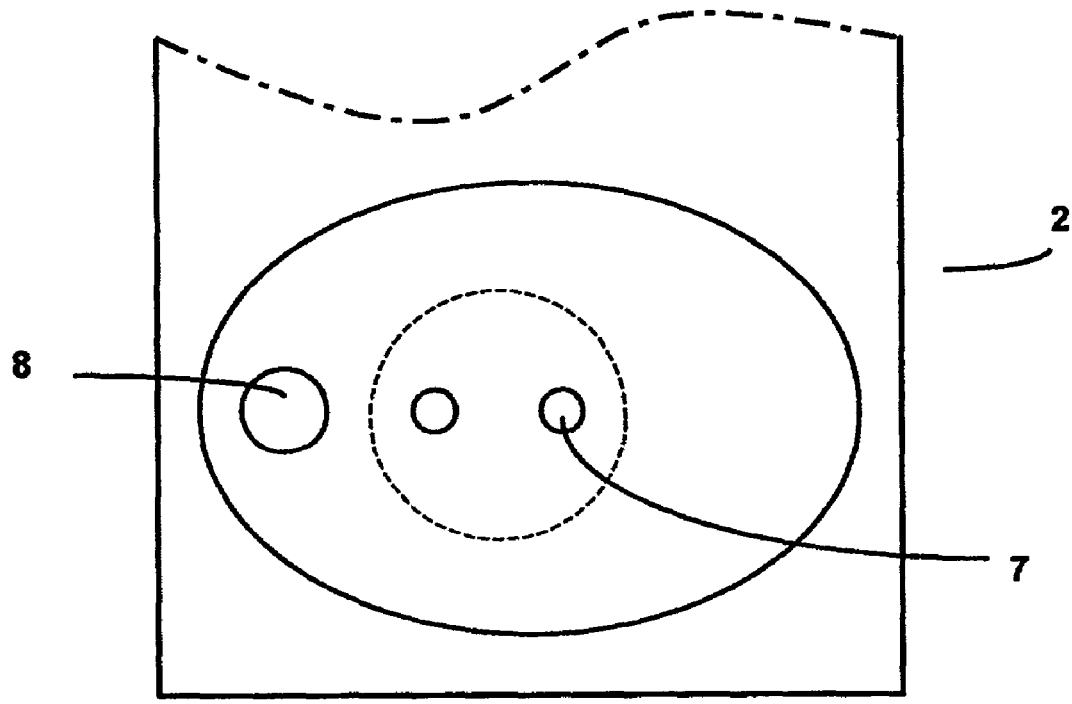
FIG. 2 is a top view of the telephone handset according to the invention.

FIG. 1 is a sectional view of an earpiece of a telephone handset 1 according to the invention. The telephone handset 1 has a casing 2 in which there is a cavity 3. There is a first aperture 7 in a wall 6 of the casing 2. This first aperture 7 provides communication between the cavity and the exterior of the casing. A transducer 4 is disposed in the cavity 3 and fastened to the wall 6. The transducer includes a membrane 5 that blocks the first aperture 7. A second aperture 8 is formed in the wall of the casing and provides communication between the cavity 3 and the exterior of the casing. A tube 9 projects into the cavity and one of its ends is fixed to the wall 6 and surrounds the second aperture 8.

The transducer 4 is placed near the first aperture 7 to obtain an optimum amplitude of the emitted sound signal. The transducer can generate sound signals in the frequency band of human hearing, for example from 300 Hz to 3 400 Hz.

The cavity 3 and the second aperture 8 form an acoustic resonator. The second aperture 8 and the tube 9 form an acoustic mass. Thus the soundwave from the rear of the earpiece is delayed. A resonance is therefore obtained by constructive interference of soundwaves from the front of the earpiece and soundwaves from the rear of the earpiece. The frequency response curve of the earpiece in speakerphone or handsfree mode therefore shows amplification of low frequencies. A base reflex or anti-resonant earpiece is thus obtained in handsfree mode. The response curve in discreet earpiece mode is generally flat and relatively insensitive to leaks, making the earpiece leak-tolerant in discreet mode, meaning that the response curves vary little in the presence of leaks. The earpiece therefore has improved sound quality both in discreet mode, because of its tolerance of leaks, and in speakerphone or handsfree mode. This kind of earpiece is therefore a true multifunction earpiece.

The embodiment shown uses a cylindrical tube 9. This shape is simple to fabricate and ensures good sound reproduction. The tube 9 preferably has an axis substantially normal to the wall 6 of the casing. The tube can be made of polyethylene, for example. By using a tube of appropriate length and diameter, the cut-off frequency can be moved toward the bottom end of the audible range. A tube longer than 3 mm is preferably used to amplify low frequencies. A tube can equally well be used such that the ratio between the height H of the cavity, as defined below, and the length of the tube is greater than 5:1 to amplify low frequencies. A tube thicker than 0.5 mm can equally be used to amplify low frequencies further.

It is desirable to provide a seal 10 to fix and seal the transducer 4 to the wall 6. It is also possible to accommodate a printed circuit (not shown) of the telephone in the cavity 3.

It is also possible to provide a plurality of apertures 7 blocked by the membrane 5. This increases the bandwidth.

The first aperture 8 is preferably in the area of the casing intended to come into contact with the ear of the user. The first aperture 7 and the second aperture 8 are preferably less than 25 mm apart on the same wall. This dimension is less than the average width of the human ear and thus enables a user to place their ear over the first and second apertures 7 and 8. The sound quality perceived by the user is improved even in discreet earpiece mode.

Conclusive trials have been carried out on a telephone handset having a cavity 3 with a height H of 10 mm, a length L of 50 mm, and a depth P of 30 mm. There was also a 3.5 mm diameter second aperture 8. The tube 9 used for these trials projected 6 mm into the cavity 3. The resulting resonator had a resonant frequency of the order of 500 Hz, a sufficiently low frequency for good sound reproduction in handsfree mode.

Figure 3:
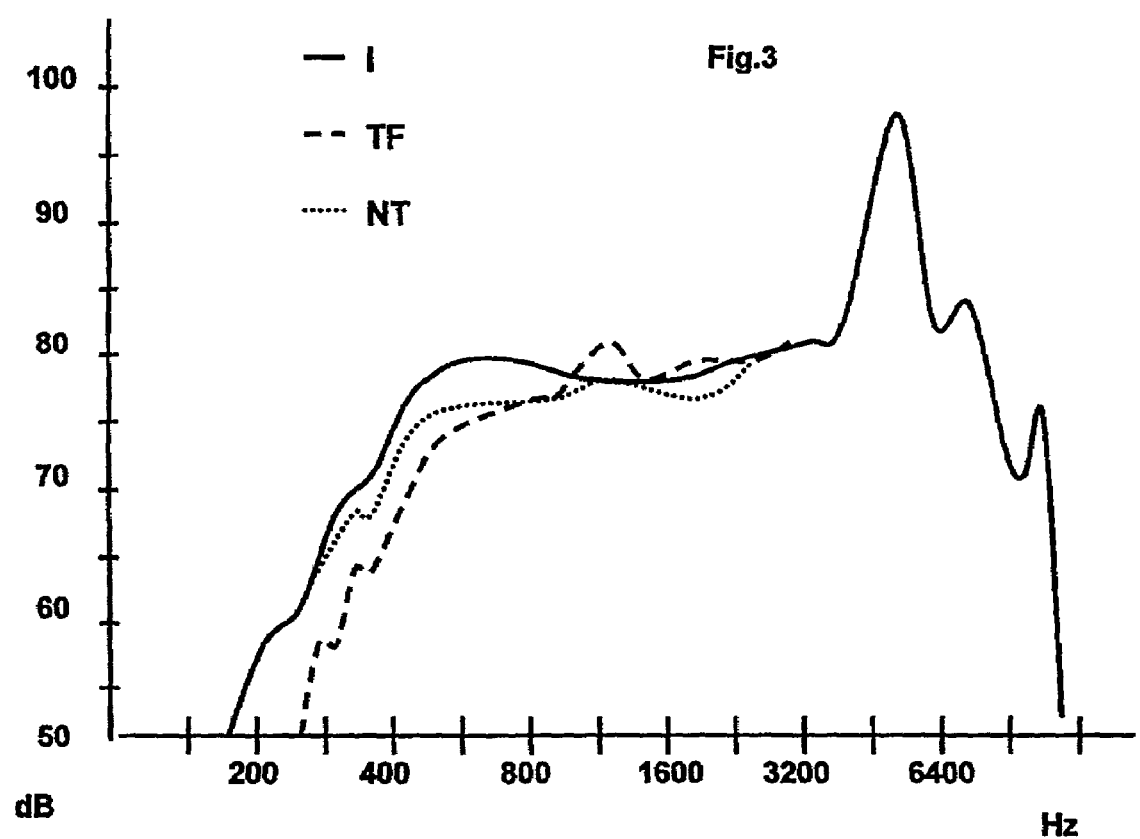
FIG. 3 shows a frequency response curve in speakerphone mode of a handset according to the invention compared to prior art handsets.

FIG. 3 shows a frequency response curve of the handset in speakerphone mode, compared to prior art handsets. The curve I corresponds to the handset of the invention, the curve TF corresponds to a leak-tolerant handset, and the curve NT corresponds to a handset that is not leak-tolerant. Note the much greater amplification of low frequencies with the handset of the invention compared to the prior art handsets.

Figure 4:
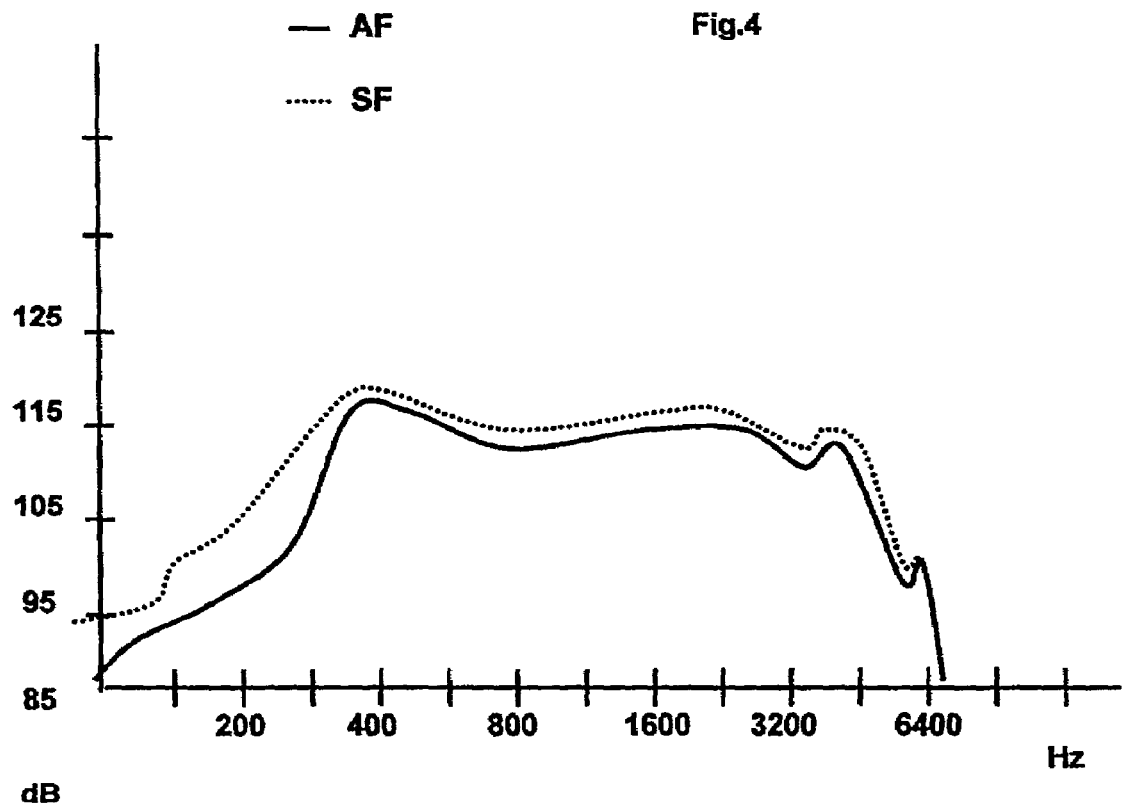
FIG. 4 shows a frequency response curve in discreet mode of a handset according to the invention, comparing operation with and without leaks.

FIG. 4 shows frequency response curves of the handset according to the invention in discreet operating mode, with and without leaks. The curve AF corresponds to operation with leaks and the curve SF corresponds to operation without leaks. The leaks have little influence on the frequency response of the earpiece, which is characteristic of an earpiece that is leak-tolerant in discreet mode.

The above embodiments and examples are provided by way of non-limiting illustrative example only, and the invention is not limited to any of the details described here, but is open to modifications that remain within the scope of the accompanying claims. For example, within the scope of the invention, it is possible to use a tube of square section or to provide a plurality of apertures 8 in the casing of the telephone.

What is claimed is:

1. A telephone handset, comprising:
   a casing;
   a cavity formed in said casing;
   a first aperture in a wall of said casing whereby said cavity communicates with the exterior of said casing;
   a transducer having a membrane blocking said first aperture;
   a second aperture in a wall of said casing whereby said cavity communicates with the exterior of said casing; and
   a tube projecting into said cavity and one end of which is fixed to said wall of said casing and surrounds said second aperture,
   wherein the first aperture and the second aperture are on a common side of said casing, and wherein the handset casing is structured to be held by a user's hand and brought to a user's ear so that the first aperture is immediately adjacent or in contact with the user's ear for listening during a normal operation mode of the handset,
   wherein the transducer and the tube are contained together within the cavity formed in the casing having the first aperture and the second aperture on the common side thereof.

2. The telephone handset claimed in claim 1 wherein said transducer is adapted to emit selectively sound at a power greater than 250 mW.

3. The telephone handset claimed in claim 1 wherein said tube has a length greater than 3 mm.

4. The telephone handset claimed in claim 2 wherein said tube has a length greater than 3 mm.

5. The telephone handset claimed in claim 1 wherein said tube has an axis normal to said wall to which it is fixed.

6. The telephone handset claimed in claim 2 wherein said tube has an axis normal to said wall to which it is fixed.

7. The telephone handset claimed in claim 3 wherein said tube has an axis normal to said wall to which it is fixed.

8. The telephone handset claimed in claim 4 wherein said tube has an axis normal to said wall to which it is fixed.

9. The telephone handset claimed in claim 1 wherein said first and second apertures are less than 25 mm apart on the common side of said casing.

10. The telephone handset claimed in claim 2 wherein said first and second apertures are less than 25 mm apart on the common side of said casing.

11. The telephone handset claimed in claim 3 wherein said first and second apertures are less than 25 mm apart on the common side of said casing.

12. The telephone handset claimed in claim 4 wherein said first and second apertures are less than 25 mm apart on the common side of said casing.

13. The telephone handset claimed in claim 5 wherein said first and second apertures are less than 25 mm apart on the common side of said casing.

14. The telephone handset claimed in claim 6 wherein said first and second apertures are less than 25 mm apart on the common side of said casing.

15. The telephone handset claimed in claim 7 wherein said first and second apertures are less than 25 mm apart on the common side of said casing.

16. The telephone handset claimed in claim 8 wherein said first and second apertures are less than 25 mm apart on the common side of said casing.

17. The telephone handset claimed in claim 1 including a plurality of first apertures blocked in a sealed manner by said membrane.

18. The telephone handset claimed in claim 2 including a plurality of first apertures blocked in a sealed manner by said membrane.

19. The telephone handset claimed in claim 3 including a plurality of first apertures blocked in a sealed manner by said membrane.

20. The telephone handset claimed in claim 4 including a plurality of first apertures blocked in a sealed manner by said membrane.

21. The telephone handset claimed in claim 5 including a plurality of first apertures blocked in a sealed manner by said membrane.

22. The telephone handset claimed in claim 6 including a plurality of first apertures blocked in a sealed manner by said membrane.

23. The telephone handset claimed in claim 7 including a plurality of first apertures blocked in a sealed manner by said membrane.

24. The telephone handset claimed in claim 8 including a plurality of first apertures blocked in a sealed manner by said membrane.

25. The telephone handset claimed in claim 9 including a plurality of first apertures blocked in a sealed manner by said membrane.

26. The telephone handset claimed in claim 10 including a plurality of first apertures blocked in a sealed manner by said membrane.

27. The telephone handset claimed in claim 11 including a plurality of first apertures blocked in a sealed manner by said membrane.

28. The telephone handset claimed in claim 12 including a plurality of first apertures blocked in a sealed manner by said membrane.

29. The telephone handset claimed in claim 13 including a plurality of first apertures blocked in a sealed manner by said membrane.

30. The telephone handset claimed in claim 14 including a plurality of first apertures blocked in a sealed manner by said membrane.

31. The telephone handset claimed in claim 15 including a plurality of first apertures blocked in a sealed manner by said membrane.

32. The telephone handset claimed in claim 16 including a plurality of first apertures blocked in a sealed manner by said membrane.

33. The telephone handset claimed in claim 1 including a printed circuit accommodated in said cavity.

34. The telephone handset claimed in claim 2 including a printed circuit accommodated in said cavity.

35. The telephone handset claimed in claim 3 including a printed circuit accommodated in said cavity.

36. The telephone handset claimed in claim 4 including a printed circuit accommodated in said cavity.

37. The telephone handset claimed in claim 5 including a printed circuit accommodated in said cavity.

38. The telephone handset claimed in claim 6 including a printed circuit accommodated in said cavity.

39. The telephone handset claimed in claim 7 including a printed circuit accommodated in said cavity.

40. The telephone handset claimed in claim 8 including a printed circuit accommodated in said cavity.

41. The telephone handset claimed in claim 1, further comprising an earpiece and a mouthpiece mounted on a single handle, and wherein the first aperture is part of the earpiece.

42. The wireless telephone handset of claim 1, wherein the first aperture and the second aperture are in a common wall of said casing.

43. The wireless telephone handset of claim 1, further comprising a multifunction earpiece configured to be selectively operated in a discreet mode, which requires a user to place the handset immediately adjacent or in contact with a user's ear for listening, and in a loudspeaker mode, which enables a user to be distant from the handset for listening.

44. The telephone handset of claim 1, wherein the transducer and the tube are acoustically coupled to each other by the cavity formed in the casing, said cavity having no partition wall between the transducer and the tube.

45. The telephone handset of claim 1, wherein the tube, which is on the common side of the casing with the first aperture and surrounding the second aperture, projects at least 3 mm into the cavity from the second aperture on the common side.

46. The telephone handset of claim 42, wherein the first aperture and the second aperture are in the common wall of the casing such that the first aperture and second aperture face the user's ear during the normal operation mode.

47. A wireless telephone handset, comprising,
a casing comprising a cavity that forms part of an earpiece, wherein the casing is structured to be held by a user's hand and brought to a user's ear so that the earpiece is immediately adjacent or in contact with the user's ear for listening during a discrete mode operation of the handset; and wherein the earpiece comprises:
- a first aperture in a wall of the casing, the cavity communicates with an exterior of the casing,
- a transducer having a membrane blocking the first aperture,
- a second aperture in a wall of the casing whereby the cavity communicates with the exterior of the casing, and
- a tube projecting into the cavity and one end of which is fixed to the wall of the casing and surrounds the second aperture; and electronic circuitry for selectively driving the transducer in the discrete mode, which requires the user to place the handset immediately adjacent or in contact with the user's ear for listening, and in a loudspeaker mode, which enables the user to be distant from the handset for listening, wherein the first aperture and the second aperture are on a common side of said casing, wherein the transducer and the tube are contained within the cavity formed in the casing having the first aperture and the second aperture on the common side thereof.

48. The wireless telephone handset of claim 47, further comprising a handle and a mouthpiece, and wherein the earpiece and the mouthpiece are mounted on the handle, and wherein the first aperture is part of the earpiece.

49. The wireless telephone handset of claim 47, wherein the transducer and the tube are acoustically coupled to each other by the cavity formed in the casing, said cavity having no partition wall between the transducer and the tube.

50. The wireless telephone handset of claim 47, wherein the first aperture and the second aperture are in a common wall of said casing.

51. The wireless telephone handset of claim 50, wherein the first aperture and the second aperture are in the common wall of the casing such that the first aperture and second aperture face the user's ear during the discrete operation mode.

52. The wireless telephone handset of claim 50, wherein the tube, which is on the common side of the casing with the first aperture and surrounding the second aperture, projects at least 3 mm into the cavity from the second aperture on the common side.

* * * * *